United States Patent
Ebadollahi et al.

(10) Patent No.: US 8,583,586 B2
(45) Date of Patent: Nov. 12, 2013

(54) MINING TEMPORAL PATTERNS IN LONGITUDINAL EVENT DATA USING DISCRETE EVENT MATRICES AND SPARSE CODING

(75) Inventors: Shahram Ebadollahi, White Plains, NY (US); Jianying Hu, Bronx, NY (US); Martin S. Kohn, East Hills, NY (US); Noah Lee, New York, NY (US); Robert K. Sorrentino, Rancho Palos Verdes, CA (US); Jimeng Sun, White Plains, NY (US); Fei Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 13/011,632

(22) Filed: Jan. 21, 2011

(65) Prior Publication Data

US 2012/0191640 A1    Jul. 26, 2012

(51) Int. Cl.
  *G06N 5/02*    (2006.01)
(52) U.S. Cl.
  USPC .............................................. 706/53; 706/20
(58) Field of Classification Search
  None
  See application file for complete search history.

(56) References Cited

U.S. PATENT DOCUMENTS

| | | | |
|---|---|---|---|
| 6,718,317 B1* | 4/2004 | Wang et al. ............... | 706/50 |
| 6,907,426 B2 | 6/2005 | Hellerstein et al. | |
| 7,526,461 B2* | 4/2009 | Srinivasa et al. ............ | 706/20 |
| 7,644,078 B2* | 1/2010 | Sastry et al. ............... | 706/20 |
| 7,644,079 B2* | 1/2010 | Sastry et al. ............... | 706/20 |
| 8,037,010 B2* | 10/2011 | Jaros et al. ................ | 706/62 |
| 8,185,481 B2* | 5/2012 | Long et al. ................ | 706/12 |
| 8,219,507 B2* | 7/2012 | Jaros et al. ................ | 706/12 |
| 8,285,667 B2* | 10/2012 | Jaros et al. ................ | 706/60 |
| 2006/0106797 A1 | 5/2006 | Srinivasa et al. | |
| 2009/0018994 A1* | 1/2009 | Hajdukiewicz ............ | 707/2 |
| 2009/0228443 A1* | 9/2009 | Lapin et al. ................ | 707/3 |
| 2009/0281838 A1 | 11/2009 | Lynn et al. | |

OTHER PUBLICATIONS

O'Grady P. et al., "Discovering speech phones using convolutive non-negativematrix factorisation with a sparseness constraint", Neurocomputing 72 (2008) 88-101.*

Cichocki A. et al., "Fast Local Algorithms for Large Scale Non-negativeMatrix and Tensor Factorizations", IEICE Trans. Fundamentals, 2009.*

Lee N. et al., "Mining electronic medical records to explore the linkage between healthcare resource utilization and disease severity in diabetic patients", 2011 First IEEE International Conference on Healthcare Informatics, Imaging and Systems Biology, pp. 250-257.*

Wang F. et al., "A Framework for Mining Signatures from Event Sequences and Its Applications in Healthcare Data", IEEE Transactions on Pattern Analysis and Machine Intelligence, vol. 35, No. 2, Feb. 2013, pp. 272-285.*

(Continued)

*Primary Examiner* — Jeffrey A Gaffin
*Assistant Examiner* — Dave Misir
(74) *Attorney, Agent, or Firm* — Tutunjian & Bitetto, P.C.; Louis J. Percello (57) ABSTRACT

Methods and systems for event pattern mining are shown that include representing longitudinal event data in a measurable geometric space as a temporal event matrix representation (TEMR) using spatial temporal shapes, wherein event data is organized into hierarchical categories of event type and performing temporal event pattern mining with a processor by locating visual event patterns among the spatial temporal shapes of said TEMR using a constraint sparse coding framework.

24 Claims, 7 Drawing Sheets

(56) References Cited

OTHER PUBLICATIONS

Bengio, S., et al., "Group Sparse Coding", Neural Information Processing Systems Foundation; Poster Session, Dec. 2009. pp. 1-8.
Chen, S., et al., "Atomic Decomposition by Basis Pursuit", 2001 Society for Industrial and Applied Mathematics; SIAM Review, vol. 43, No. 1, Feb. 2001. pp. 129-159.
Cichocki, A., et al., "Non-Negative Tensor Factorization Using Alpha and Beta Divergences", Acoustics, Speech and Signal Processing, 2007, ICASSP 2007, IEEE International Conference; Apr. 2007. 4 pages.
Eggert, J., et al., "Sparse Coding and NMF", 2004 IEEE, Jul. 2004. pp. 2529-2533.
Eggert, J., et al., "Transformation-Invariant Representation and NMF", Proc. Int. Joint Conf. on Neural Networks IJCNN 2004, Jul. 2004. pp. 2535-2539.
Fevotte, C., et al., "Algorithms for Nonnegative Matrix Factorization With the B-Divergence", hal-00522289, version 3, Oct. 2010. pp. 1-20.
Hoyer, P., "Non-Negative Sparse Coding", Neural Networks for Signal Processing XII, Proc. IEEE Workshop on Neural Networks for Signal Processing, Martigny, Feb. 2002. 8 pages.
Lee, D., et al., "Algorithms for Non-negative Matrix Factorization", IIn Advances in Neural Information Processing Systems 13, Apr. 2001. 7 pages.
Lee, H., et al., "Group Nonnegative Matrix Factorization for EEG Classification", Proceedings of the 12th International Conference on Artificial Intelligence and Statistics, vol. 5 of JMLR: W&CP 5, Apr. 2009. pp. 320-327.
Lin, J., et al., "A Symbolic Representation of Time Series, with Implications for Streaming Algorithms", DMKD'03, ACM1-58113-763-x, Jun. 2003. pp. 2-11.
Moerchen, F., et al., "Efficient Mining of Understandable Patterns From Multivariate Interval Time Series", Data Mining and Knowledge Discovery vol. 15 Issue 2, Oct. 2007. pp. 1-39.
Moerchen, F., et al., "Robust Mining of Time Intervals With Semi-Interval Partial Order Patterns", In Proceedings SIAM Conference on Data Mining (SDM), Apr. 2010, pp. 315-326.
Moerchen, F., "Time Series Knowledge Mining", KDD '06 Proceedings of the 12th ACM SIGKDD international conference on Knowledge discovery and data mining, ISBN:1-59593-339-5, Aug. 2006. 178 pages.
O'Grady, P., et al., "Discovering Convolutive Speech Phones Using Sparseness and Non-Negativity", Proceedings of the Seventh International Conference on Independent Component Analysis, Sep. 2007. pp. 520-527.
Smaragdis, P., "Non-Negative Matrix Factor Deconvolution; Extracation of Multiple Sound Sources from Monophonic Inputs", International Congress on Independent Component Analysis and Blind Signal Separation, ISBN: 3-540-23056-4, vol. 3195/2004, Sep. 2004. pp. 494-499.

* cited by examiner

MINING TEMPORAL PATTERNS IN LONGITUDINAL EVENT DATA USING DISCRETE EVENT MATRICES AND SPARSE CODING

BACKGROUND

1. Technical Field

The present invention relates to data mining and, in particular, to methods and systems for extracting meaningful information from temporal event data.

2. Description of the Related Art

Temporal event mining is the process of identifying and extracting latent temporal patterns from large complex event data. The goal of event mining is to derive insight that leads to useful information and true knowledge for an accurate understanding of the underlying event processes and relationships. It is the transformation from data to information to true knowledge that is of interest to business, the science, and government.

In this regard, finding optimal knowledge representations is important when one talks about abstract models as surrogates of the real world that must be understood by humans. Knowledge representation (KR) and reasoning is an area of artificial intelligence whose fundamental goal is to represent knowledge in a manner that facilitates the inference process from knowledge. An optimal knowledge representation should exhibit the following characteristics: i) minimalism, ii) interpretability, and iii) novelty. Further, the knowledge representation should be commensurate with human constraints and abilities so people can quickly absorb, understand, and make most efficient use of complex event data. All attempts to produce such a knowledge representation to date have fallen short. One drawback of these attempts is that symbolic languages specify temporal knowledge a priori, which limits the flexibility of learning unknown patterns in temporal event data.

SUMMARY

A method for event pattern mining includes representing longitudinal event data in a measurable geometric space as a temporal event matrix representation (TEMR) using spatial temporal shapes, wherein event data is organized into hierarchical categories of event type, and performing temporal event pattern mining with a processor by locating visual event patterns among the spatial temporal shapes of said TEMR using a constraint sparse coding framework.

A further method for event pattern mining includes mapping longitudinal event data from a probabilistic event space to a temporal event matrix representation (TEMR) in a measurable geometric space, wherein event data is organized into hierarchical categories of event type, performing temporal event pattern mining with a processor by locating visual event patterns among the spatial temporal shapes of said TEMR using a processor to perform online non-negative matrix factorization by clustering and ranking multiple entities into pattern groups, and refining the learned patterns using user feedback.

A system for event pattern mining includes an event matrix generator configured to represent longitudinal event data in a measurable geometric space as a temporal event matrix representation (TEMR) using spatial temporal shapes, wherein event data is organized into hierarchical categories of event type, and a temporal event data mining component configured to perform temporal event pattern mining with a processor by locating visual event patterns among the spatial temporal shapes of the TEMR using a constraint sparse coding framework.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Temporal event mining derives insights from data that lead to useful information and true knowledge, allowing for a precise understanding of underlying event processes and relationships. A general framework for open-ended visual interactive temporal event pattern mining is presented herein, wherein the extracted latent temporal patterns and mining system are commensurate with human capabilities. In particular, the present principles produce interpretable patterns and low dimensional visual representations of complex event data that can be quickly absorbed by human beings. The present temporal event mining includes an open-ended learning system that is able to incrementally learn the latent temporal patterns on large-scale data. Also the mining framework accounts for missing values, data sparsity, multiple sources, mixed continuous/categorical variables, binary/multi/vectorial valued elements, and heterogeneous data domains.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
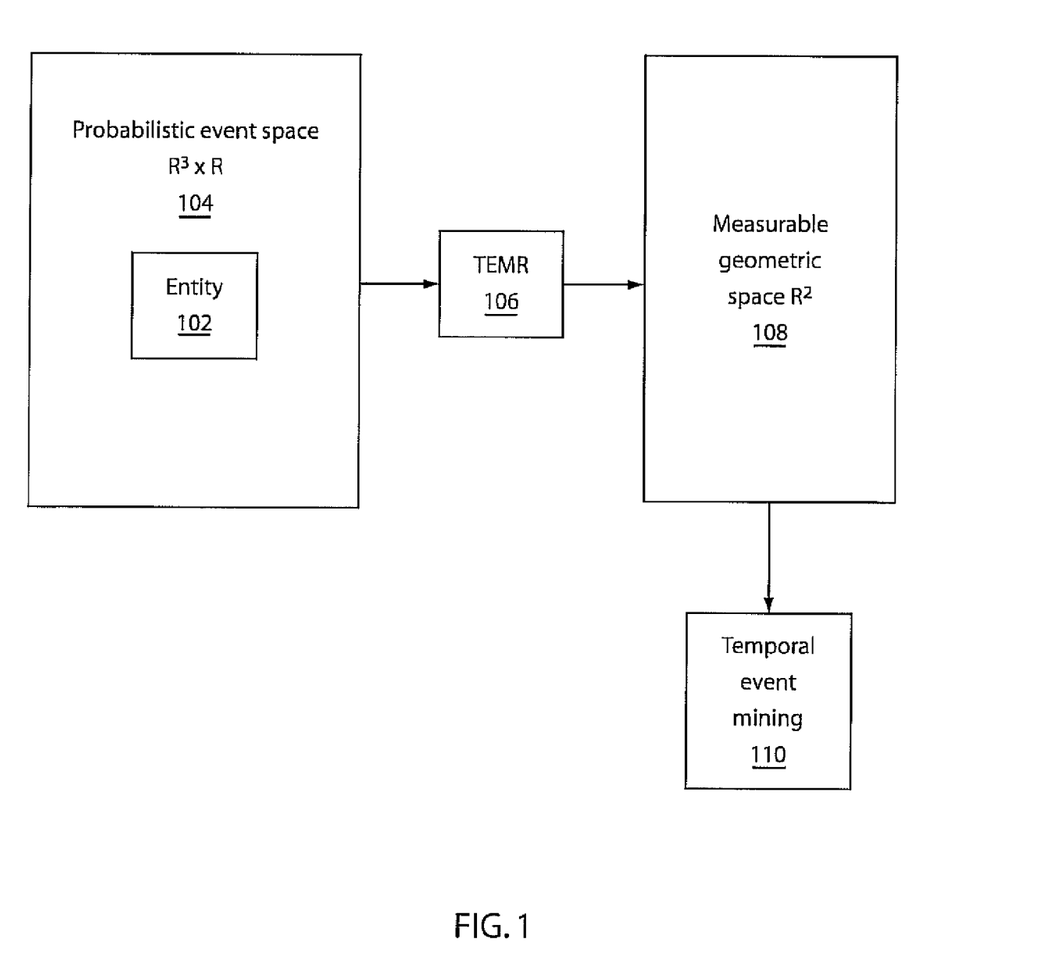
FIG. 1 is a block/flow diagram showing a geometric knowledge representation used for temporal event mining.

Referring now to the drawings in which like numerals represent the same or similar elements and initially to FIG. 1, a diagram of a geometric knowledge representation according to the present principles is shown. This representation is referred to herein as a temporal event matrix representation (TEMR). An entity 102 can be a person, a patient, an object, or a location. Each entity has associated a probabilistic event space 104 comprised of a space and a time dimension, such that the space may be characterized as having dimensionality $R^3 \times R$. TEMR 106 maps the space-time dimensionality $R^3 \times R$ of a probabilistic event space 104 onto a measurable geometric space 108 having dimensionality $R^2$. This projective mapping produces a rich set of mathematical constructs to perform temporal event mining 110 by taking into account spatial-temporal information encoded by TEMR 106. In TEMR 106, hybrid combinations of semantic-invariant shape and probabilistic metrics are possible that provide a flexible framework for temporal event mining 110.

TEMR 106 allows the encoding of the temporal concepts of order, duration, coincidence, concurrency, synchronicity, and periodicity of time patterns such as events, periods, and trends. The use of geometric visual shape primitives provides a rich set of constructs to model, learn, and perform inference on the chosen representational space 108. Temporal operators for qualitative temporal reasoning have quantitative meaning in the measurable geometric space that allows temporal operators to be expressed in terms of geometric properties and distance metrics. These temporal operators may include, for example, before, after, close, equals, shortly after, and soon after. By using shape invariant metrics, semantic invariances can be modeled and introduced into the analysis. The chosen geometric representational space offers a wide set of tools which may be applied from the signal and image processing community.

In this way, the present principles provide a geometric knowledge representation 108 for temporal event mining. TEMR 106 maps the space-time dimensionality of a probabilistic event space 104 onto a measurable geometric space 108 by encoding event data as a structured spatial-temporal shape or point process. This projective mapping may be achieved by using a rich geometric visual symbol system forming a structured two-dimensional sparse matrix. This approach is exemplified herein with point processes assuming the most simplistic form of an event. Such point processes are modeled herein as a binary random variable.

Figure 2:
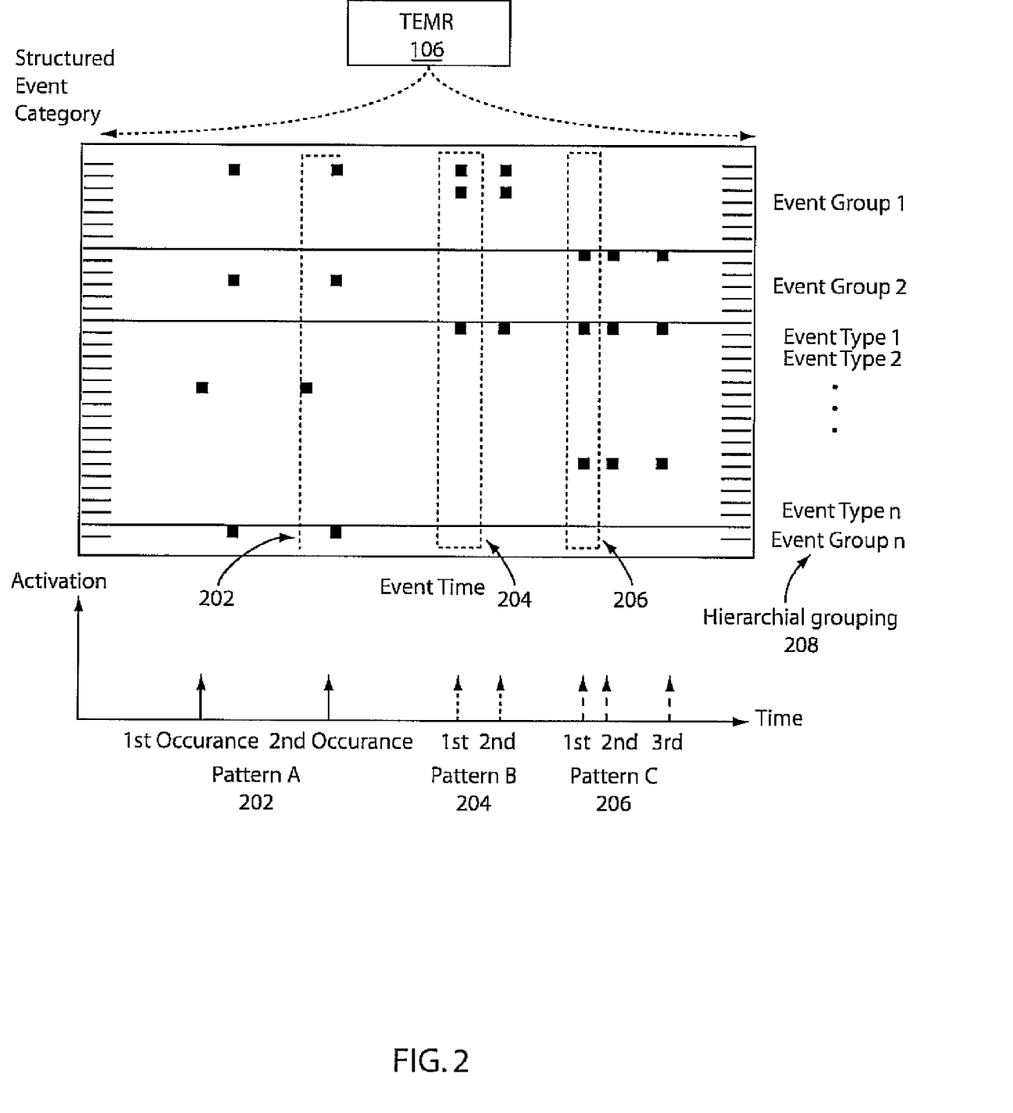
FIG. 2 is a diagram showing a temporal event matrix representation (TEMR) of event data.

Referring now to FIG. 2, an example of the TEMR 106 is shown as a realization of a spatial-temporal shape process. TEMR is composed of a set of geometric shape primitives that symbolize event data in a two-dimensional sparse matrix representation. The set of geometric shape primitives can be arbitrary (e.g. including a set of visual variables of position, size, shape, value, color, orientation, and texture). FIG. 2 exemplifies the concept by showing the simplest primitive of a binary activation unit in the form of a black square. TEMR is a sparse two-dimensional discrete matrix, representing the measurable geometric space 108, where the rows of the matrix correspond to pre-specified structured event categories and the columns of the matrix to the time domain. In other words, the horizontal axis represents time, whereas the vertical axis represents event type. Based on the chosen visual variables, the row and column mapping can change according to the size of the visual encoding. The rows of TEMR are further structured into a hierarchical grouping 208, where the event space is grouped into semantic similar groups. Events are further grouped into temporally neighboring patterns 202, 204, and 206, and an activation graph shows the occurrence and recurrence of these patterns over time. To learn a sparse representation of the latent temporal patterns and their activation codes the present invention uses a constraint convolutional sparse coding framework.

Sparsity may arise in two contexts. First, binary event realizations, where a '1' indicates that an event happened and a '0' indicates that an event did not happen, usually are sparse in the number of events that fill the space. TEMR 106 thus encodes missing events within the measurable geometric space 108. As a result, the majority of the sparse two-dimensional matrix elements will have '0' entries and only a few elements will have non-zero entries. This is referred to as data sparsity. Second, latent temporal event patterns also exhibit a sparse structure. Latent temporal patterns, shown as a set of rows and columns within the sparse two-dimensional matrix or alternatively as a sub-region within the matrix, can happen at sparse time instances as well. A sparse representation offers efficient storage and also aids interpretability at the data level and the model level. Learning a sparse representation of TEMR 106 is also referred to as learning a latent factor model. Sparsity is particularly relevant to model interpretability. To exemplify this, consider FIG. 2. The activation plot exhibits a sparse structure, such that the majority of entries are zero. In the converse case, where most entries would be non-zero, it would be difficult for an unaided person to see patterns in the data.

The constrained convolutional sparse coding framework learns minimalistic and interpretable latent temporal event patterns from single and multiple spatial-temporal point processes (STPP). Double sparsity (i.e. the sparsity in the data as well as in the latent factor model) can be dealt with by using the beta-divergence. The beta-divergence is a parameterized family of cost functions that measures the difference between two probability distributions. The present principles use a special case of the beta-divergence, where β=0.5, since because this parameterization optimally copes with binary data. Convolutional sparse population coding is further introduced below. This coding is able to learn multiple group specific latent factors simultaneously. Stochastic optimization allows for large-scale incremental learning of multiple STPPs in a group.

Each event group itself contains a variable number of different event types. The horizontal lines in the Structured Event Category graph of FIG. 2 visualize the vertical partition of the event grouping. In the matrix, the black squares correspond to event realizations of different event types, whereas white space corresponds to non-event realizations. In this way, missing event values are encoded within the TEMR 106. Within the matrix of FIG. 2, three different temporal patterns are shown. A first pattern A thus contains, e.g., the following information: An event of type 6 in event group 3 occurred followed by three simultaneous events in event group 1, 2, and group n at the second, third, and first row of each group respectively. Pattern A 202 has two occurrences in this TEMR 106. Pattern B 204 also has two occurrences, while pattern C 206 has three occurrences. The arrows in the activation plot represent the sparse time locations where the different patterns occur.

The fundamental unit of analysis is a single event from which a pair of events can be used to define an event interval or a set of ordered events to define an event sequence. Each event sequence belongs to a labeled category that is itself part of a hierarchical grouping 208. Multiple event sequences and hierarchies can be encoded with TEMR forming a multivariate representation, where the rows of the temporal event matrix encode event categories and the columns of the matrix the time domain. In what follows, such a multivariate event sequence may be viewed as a structured STPP.

The term sparse coding refers to the modeling of data x as a sparse linear combination of basis atoms $\Phi=[\phi_1, \ldots, \phi_k]$, with $\phi_i \in R^{m \times l}$ and their weighting or activation coefficients $\alpha=[\alpha_1, \ldots, \alpha_k]^T$. Consider a sparse linear data model with additive noise $n \in R^{m \times l}$ of the following form:

$$[x] = [\phi_1 \ldots \phi_k] \begin{bmatrix} \alpha[1] \\ \vdots \\ \alpha[k] \end{bmatrix} + [n] \qquad (1)$$

The input data $x \in R^m$ permits a sparse approximation over a bases set $\Phi \in R^{m \times k}$, with k atoms determined by the weighting coefficients $\alpha \in R^k$, where one can find a linear combination of a sparse set of bases atoms from $\Phi$, such that it closely approximates the input data.

The sparse decomposition problem can be formulated as the sum of a loss function $L(\bullet)$ and a regularization term $\phi(\bullet)$:

$$\alpha^* = \min_\alpha (O(x, \Phi, \alpha)) \qquad (2)$$

$$O(x, \Phi, \alpha) = L(x, \Phi, \alpha) + \lambda \varphi(\alpha) \qquad (3)$$

$$L(\cdot) = \frac{1}{2}\|x - \Phi\alpha\|_F^2, \qquad (4)$$

where λ denotes the sparsity including weighting factor for the regularizer and $\|\bullet\|_F$ denotes the Frobenius norm. By choosing $\phi(\bullet)$ to be the $l_1$-norm (e.g., $$\varphi(\alpha) = \|\alpha\|_1 \triangleq \sum_i^p |\alpha[i]|,$$

equations 2-4 may also be interpreted as a basis-pursuit or lasso problem. To obtain a sparse representation, the $l_1$-norm regularizer is convex and serves as a proxy for the NP-hard $l_0$-norm. The objective in the above equations has no analytic closed form solution, such that iterative approaches are used. These iterative approaches may include greedy algorithms, homotopy, soft-thresholding, active set, or reweighted $l_2$ methods. These methods are listed for the sake of example and are not intended to be limiting.

Non-negative matrix factorization (NMF) arises as an extension of large-scale non-negative least squares. NMF finds a "parts-based" or "sum-of-parts" linear representation of non-negative data. Given a non-negative data matrix $X=[x_1, \ldots, x_2] \in R_+^{m \times n}$ and a positive integer r=min(m,n), NMF computes a low-rank approximation:

$$X \approx WH = \sum_{k=1}^{r} W_{ik} H_{kj}, \quad (5)$$

with W being a factor matrix, H being a scores matrix, and r being a low-rank factor. Usually, r<<(m,n) (n+m)r<nm, and i, j, and k are matrix indices. The indices i and j refer to a matrix row and column respectively. The above equation decomposes a non-negative matrix into a product of two lower-rank non-negative matrices. The r columns of $W \in R_+^{m \times r}$ are basis vectors and each row of $H \in R_+^{r \times n}$ is a linear encoding representing the mixing coefficients or "weights" for each basis.

In vector notation, each n columns of $X=[x_1, \ldots, x_2]$ $\in R_+^{m \times n}$ is a linear combination of the columns of W weighted by the row coefficients of H:

$$x_i \approx \sum_{k=1}^{r} w_{\cdot i} h_{kj}, \quad (6)$$

where $w_{\cdot i}$ is the column vector of W. The conventional solution approach to eq. (6) is to solve the following constrained optimization problem:

$$\min_{W,H} = \|X - WH\|_F^2 = \sum (X_{ij} - (WH)_{ij})^2 \quad (7)$$

$$\text{subject to } \forall ij: [w]_{ij} \geq 0, [h]_{ij} \geq 0, \forall i: \|w_i\| = 1 \quad (8)$$

where $\|\cdot\|_F$ is the matrix Frobenius norm. Various strategies may be used to minimize eqs (7) and (8), such as alternating least-squares, multiplicative update rules, projected gradient descent algorithms, and hybrid derivatives. These strategies are presented for the sake of example and are not intended to be limited in any way.

The NMF framework may incorporate sparsity by using a regularizer, as above in eq (3), which enforces sparsity in the coefficient matrix H. Non-negative sparse coding of a non-negative data matrix $X \in R_+^{m \times n}$ may be implemented by formulating the optimization problem:

$$\{W^*, H^*\} = \min_{W,H} O(X, W, H) \quad (9)$$

$$O(X, W, H) = \frac{1}{2}\|X - WH\|^2 + \lambda \sum_{ij} [h]_{ij} \quad (10)$$

$$\text{subject to } \forall ij: [w]_{ij} \geq 0, [h]_{ij} \geq 0, \forall i: \|w_i\| = 1 \quad (11)$$

where the last constraint is a scaling constraint enforced on W to prevent trivial solutions of the factorization due to the sparsity inducing regularizer. A multiplicative update rule may be used for H and a projected gradient descent may be used to update W:

$$H := H \circ (W^T X)/(W^T W H + \lambda) \quad (12)$$

$$W := P[W - \eta(WH - X)H^T] \quad (13)$$

$$\text{where } P(u) = \begin{cases} u_{ij}, & \text{if } u_{ij} \geq 0 \\ 0, & \text{if } u_{ij} < 0 \end{cases} \quad (14)$$

$$\text{with } u_i^T u_i \leq 1. \quad (15)$$

A transformation-invariant form includes introducing a linear transformation operator (or "shift" operator) T into the NMF objective. Transformation invariance can be incorporated into the sparse coding formulation described above by performing a stochastic optimization within a convolutional sparse coding framework to support large-scale factorization of single and multiple STPPs for common group learning. When $\beta=0.5$, parameterized beta-divergence achieves superior performance and can be extended to allow factorization of a common dictionary for group learning.

By using online NMF (ONMF), latent factors may be automatically updated by combining old factors with newly acquired data. At the same time, ONMF can discover the connections between old and new factors, allowing the evolutionary patterns of latent factors to be tracked naturally. In addition, when the available data is incomplete, latent factors produced by NMF may be incorrect. To prevent the partial-data problem in ONMF, a set of orthogonal constraints is imposed on all of the latent factors. Additionally, an orthogonal NMF algorithm according to the present principles guarantees the uniqueness of the NMF decomposition, which helps in tracking latent factors. The present approach incorporates stochastic optimization within a convolutional sparse coding framework by employing a special case of the parameterized beta-divergence. The update equations, which are discussed in greater detail below, employ multiplicative update rules.

The temporal event matrix representation (TEMR) 106 provided by the present principles and shown in FIG. 2 uses a geometric approach to condense information into an effective but human-readable form. Whereas symbolic languages define temporal concepts a priori, the present geometric knowledge representation is able to represent and learn unknown temporal patterns. In addition, TEMR condenses complex multivariate temporal event relationships into an intuitive, interpretable, and simple visual form.

Temporal event pattern mining uses an efficient knowledge representation to facilitate intelligent reasoning and inference for knowledge discovery. An optimal knowledge representation should exhibit the following characteristics: i) flexibility, ii) minimalism, iii) interpretability, and iv) novelty. The knowledge representation should be commensurate with human capabilities, such that information can be quickly absorbed and understood to make the most efficient use of complex event data. Flexibility allows the knowledge representation to be used in many different application contexts. Efficiency allows for large-scale analysis and for environments with limited resources. Interpretability is important for an improved understanding of the representation and its underlying model as well as the ability to adapt and change. Novelty allows the representation to discover knowledge through the extracted patterns.

TEMR 106 comprises of a set of geometric shape primitives that symbolize event data in a two-dimensional sparse matrix representation. As noted above with respect to FIG. 1, TEMR 106 maps the space-time dimensionality of a probabilistic event space 104 onto a measurable geometric space of $R^2$ 108 by encoding event data as a structured spatial-temporal shape or point process. In this arrangement, hybrid combinations of semantic-invariant shape and probabilistic metrics can be applied to facilitate knowledge reasoning and inference.

As noted above with respect to FIG. 2, the fundamental unit of analysis is a single event e, shown as a black square. A pair of events can be used to define an event interval [$e_i$, $e_{i+1}$] or a set of ordered events $e_i$ to define an event sequence (a row of black squares). Each event sequence belongs to a labeled category that is itself part of a hierarchical grouping 208. Multiple event sequences and hierarchies can be encoded with TEMR forming a multivariate representation, where the rows of TEMR encode event type categories and the columns encode the time domain. Such multivariate event sequences are viewed below as a structured STPP.

More formally, let E denote the event space, which resides in a compact subset S of $R^n$. A point process on S is a measurable map $\xi:\Omega \to R$ from the probability space $(\Omega, F, P)$ to the measurable space $(R, \mathcal{N})$, where Omega is the sample space, F and $\mathcal{N}$ a sigma-Algebra, and P the probability measure. Stochastic point processes (SPPs) can describe gaps, aggregation, and inhibition in spatial data. Every point process $\xi$ can be represented as $$\xi = \sum_{i=1}^{N} \delta_{X_i},$$

where $\delta$ denotes the Dirac measure, N is an integer-valued random variable, and $X_i$ are random elements of S. We consider a stack of multiple point processes to form a measurable map $\xi:\Omega \to R^{c \times t}$, where c indexes the event category and t indexes the time domain.

This leads to STPPs, which are random collections of points, wherein each point represents the time and location of an event. In comparison to a pure SPP, the temporal aspect of an STPP induces a natural point ordering that does not generally exist for SPPs. An STPP $\xi$ may be mathematically defined as a random measure on a region $S \subset R \times R^3$ of space-time, taking values in the non-negative integers $Z^+$.

Only binary random variables $X \in [0,1]$ are considered herein. However, this is intended only for the purpose of illustration. Alternative variables, such as multi-valued random variables $X \in [0, \ldots, K]$ or vectorial representations may also be employed in accordance with the present principles. One can generalize an STPP to higher order primitives such as spatial line or shape processes. TEMR 106 allows one to incorporate such stochastic shape processes to provide a rich geometric symbol set of visual variables to encode different event entities and temporal concepts.

An event sequence $\epsilon_{p,q} = (e_{t=1}, e_{t=2}, \ldots, e_{t=T})$ may be defined as a univariate STPP $\xi$ on R, characterizing a sequence of random variables $X_i$. Each event $e_t$ is an element of the realization of $\xi$. The indices p and q index the event group level and event type level respectively (where such group and event type levels are illustrated above in FIG. 2). To extend the univariate STPP to higher order structures beyond pairwise or triple-wise interactions, multiple $\epsilon_{p,q}$, q>1 can be stacked together. Multiple event sequences $\{\epsilon_{p,q}\}$ are bi-, tri-, or multi-variate STPPs $\xi$ on $R^{c \times t}$, where c denotes the event category domain and t denotes the time domain.

Multiple STPPs $\{\xi_i\}_{i=1}^n$ form a three-way sparse tensor of the form $R^{c \times t \times n}$. An alternative representation of a group of STPPs $\mathcal{G}_\xi$ is a tensor unfolded view of the form $R^{c \times (t^*n + (n+l))^*w}$, where multiple spatial-temporal point processes $\xi_i$ are concatenated along the time domain. Multiple bi-, tri-, or multi-variate STPPs $\xi_i$ form the group $\mathcal{G}_\xi$ on $R^{c \times l \times n}$, where c is the event type domain, t is the time domain, and n is the sample cardinality of $\mathcal{G}_\xi$. Multiple groups $\mathcal{G}_\xi^{(t)}$ form a population $\mathcal{P}_\xi = \{\mathcal{G}_\xi^{(t)}\}_{i=t}^g$ of STPPs $\xi_i$.

In order to adapt TEMR to particular instances of $\xi_i$, $\mathcal{G}_\xi$, or $\mathcal{P}_\xi$, the matrix factorization framework discussed above is used to learn a minimalistic sparse representation suitable for temporal event pattern mining. In particular, the following temporal patterns are relevant: i) structured high activity patterns, ii) repeating patterns, iii) pattern trends, and iv) similar patterns in a group or population.

This may be formulated as finding a function $f:X \to Y$ that maps an input space to an output space. Here X refers to the input space of $\xi_i \in S = \{\xi_1, \ldots, \xi_n\}$ and Y refers to a hypothetical label space inducing a multi-pathway partitioning on X. Let $\mathcal{D} = \{(\xi_i, \hat{y}_i)\}_{j=1}^n$ be a pair of spatial-temporal point processes $\xi_i \in R^{c \times t}$ and partition encodings $\hat{y}_i \in Z^k$, where $\hat{y}_i$ is unknown.

First, a minimalistic efficient sparse representation $\mathcal{R}_\Theta = \{\Phi, \alpha\}$ of $\xi_i$ is generated that captures the latent structure for individual and group-based event realizations in S:

$$\mathcal{R}_\Theta^* \min_{\mathcal{R}_\Theta} O(S, \Theta) \quad (16)$$

$$\min_{\mathcal{R}_\Theta} O(S, \Theta) = \sum_{j=1}^{g} \sum_{i=1}^{n} L(\xi^{(i,j)}, \Phi, \alpha^{(i,j)}) + \lambda \varphi(\alpha^{(i,j)}). \quad (17)$$

Since n is large, a stochastic optimization scheme is used where data samples arrive in a sequential manner and $\mathcal{R}_\Theta$ is adaptively learned from $\xi_i$ incrementally:

$$\mathcal{R}_\Theta^{t+1} = \mathcal{R}_\Theta^t + O(\xi_i, \Theta, \alpha).$$

Given $\mathcal{D}$, $\hat{y}$ is found such that the learned approximation to $f$ groups similar entities to the same hypothetical label class of $\hat{y}$. Given an instance of $\xi_i \in S$, a ranking can be found that returns the most similar instances of $\xi_{j \neq i}$ to $\xi_i$.

A dynamic data model is used to learn $\xi$. The static linear data model in eq (1) does not account for the temporal aspect encoded in $\xi$. A dynamic linear data model is used having the form:

$$\xi = \Phi * \alpha + N \quad (18)$$

$$= \sum_k \sum_{r=1}^{M} \phi_k^T \alpha_{k,T} + N \quad (19)$$

$$= \sum_{k,u,v} \phi_k(i - u, j - v) \alpha_k(u, v) + N \quad (20)$$

where $\xi \in R^{n \times t}$, $\Phi \in R^{u \times v \times k}$, $\alpha \in R^{k \times t}$, * denotes a shift-invariant convolutional operator, M denotes the shift dimension, and r denotes the shift index.

Figure 3:
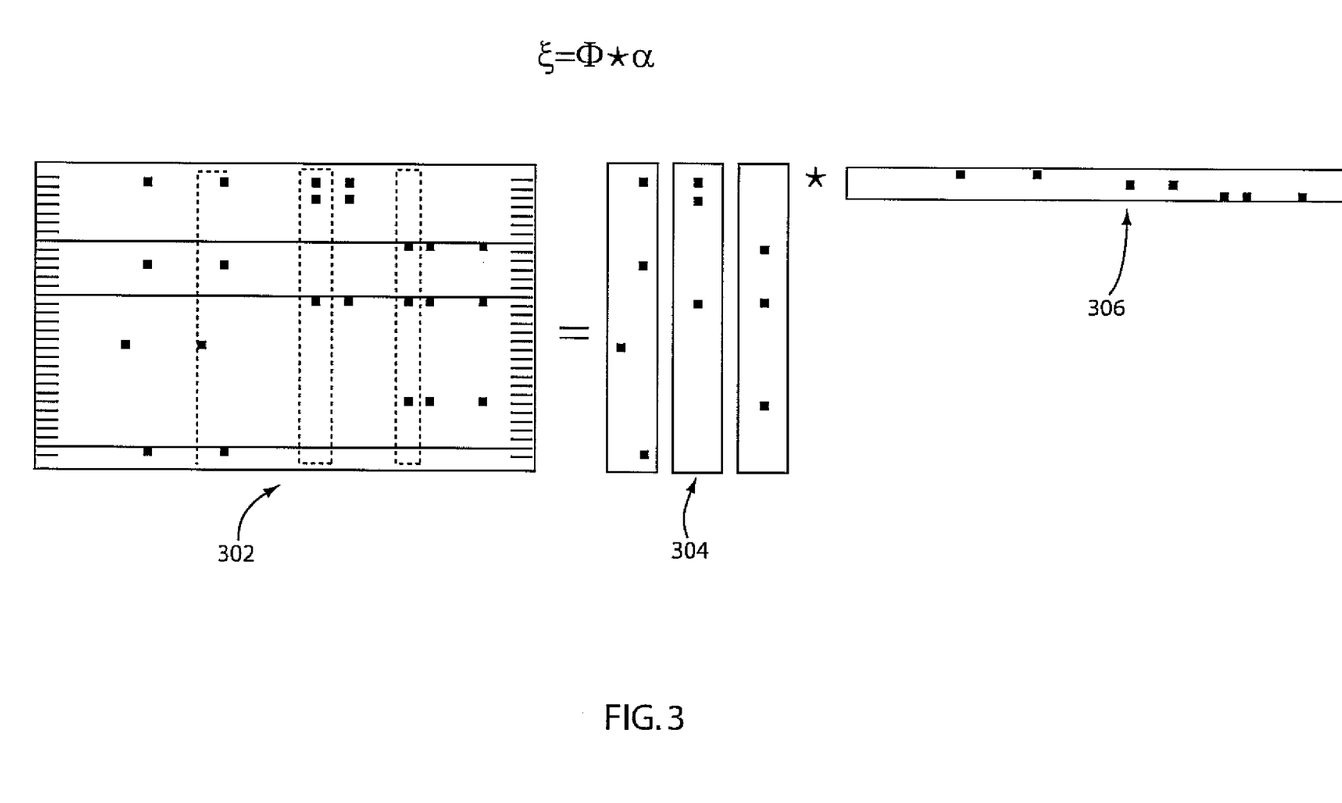
FIG. 3 is a diagram showing a sparse representation of a TEMR.

Referring now to FIG. 3, a graphical representation of equation (18) is shown, illustrating how the patterns of $\Phi$ 304 may be convolved with the sparse coding $\alpha$ 306 that shows when each of the patterns occurs. FIG. 3 is a sparse representation of TEMR 106. Equation (18) shows a dynamic data model where $\xi$ 302 represents a realization of an STPP represented with TEMR. The right hand side of equation (18) is a convolution between a basis set $\Phi$ 304 and an activation code $\alpha$ 306.

A shift-invariant dictionary $\Phi$ 304 may be found given a realization of $\xi$, as well as an associated sparse code $\alpha$ 306 of $\Phi$ 304. The emphasis is on learning an efficient minimalistic representation $\mathcal{R}_\Theta$ with $\theta = \{\Phi, \alpha\}$ of $\xi$ 302 such that a 306 exhibits a sparse structure. Learning $\mathcal{R}_\Theta$ can be achieved by coupling an approximation error objective with a sparseness constraint on the weighting coefficients, where the data model exhibits a convolutional form:

$$L(\xi, \theta) = \arg\min_\theta \frac{1}{2}\|\xi - \Phi * \alpha\|_2^2 + \lambda\|\alpha\|_1. \tag{21}$$

Eq (21) is also known as the shift-invariant or convolutional sparse coding problem. Assuming a sparse data matrix $X \in R^{c \times t}$ as a realization of $\xi$ 302, one can rewrite eq (21) into a convolutional sparse matrix factorization problem:

$$\min_{W \in R_+, H \in R_+} L(X, W, H) = \tag{22}$$

$$\frac{1}{2}\|X - W * H\|_F^2 + \lambda \sum_{i,j} f(H_{ij}) \tag{23}$$

where $\|\cdot\|_F$ denotes the Frobenius norm, * denotes the 2D convolutional operator, and $f$ denotes a sparseness measure on the coefficient matrix H (e.g, maximum absolute column sum norm, spectral norm, or maximum absolute row sum norm). Instead of $\|\cdot\|_F$, other loss functions may be defined, such as the alpha-divergence, beta-divergence, or gamma-divergence. The beta-divergence will be discussed herein, but this is intended for the purpose of illustration and is not meant to be limiting.

The beta-divergence for $R_{[0,1]}$ is defined as $$d_\beta(X \mid \tilde{X}) = \frac{1}{\beta(\beta-1)}\left(X^\beta + (\beta-1)\tilde{X}^\beta - \beta X \tilde{X}^{\beta-1}\right) \tag{24}$$

where $X \approx W*H$. Special cases of the beta-divergence are the generalized Kullback-Liebler divergence (KLD), the Itakura-Saito divergence (ISD), and the Euclidean distance (ED).

$$d_{\beta=0}^{ISD}(X \mid \tilde{X}) = \frac{X}{\tilde{X}} - \log\frac{X}{\tilde{X}} - 1 \tag{25}$$

$$d_{\beta=1}^{KLD}(X \mid \tilde{X}) = X\log\frac{X}{\tilde{X}} + \tilde{X} - X \tag{26}$$

$$d_{\beta=2}^{ED}(X \mid \tilde{X}) = \frac{1}{2}(X - \tilde{X})^2 \tag{27}$$

The scale invariant property $$d_{\beta=0}(\gamma X, \gamma \tilde{X}) = d_{\beta=0}(X, \tilde{X}), \forall \gamma > 0 \tag{28}$$

of ISD as the limiting case of the beta-divergence ($\beta=0$) allows one to find basis components of differing complexity, whereas the ED and KLD penalizes basis components of low energy. To account for double sparsity, (having sparsity in the data as well as in the latent factor model, one may regularize the divergence by inducing a double sparsity constraint on W and H. The double sparsity constraint further allows one to build an over-complete bases set, where the factorization rank k can be defined such that k is larger than the actual bases' elements in the data. The over-complete bases representation addresses the rank selection problem where irrelevant basis elements are squashed to be zero and only a few basis elements that are supported in the data are retained. The generalized form of eqs 22 and 23 for the beta-divergence is $$\min_{W \in R_+, H \in R_+} L(X, W, H) = \tag{29}$$

$$\mathcal{D}_\beta(X \mid W*H) + \lambda_1 \varphi_1(W) + \lambda_2 \varphi_2(H). \tag{30}$$

The joint objective of eqs 29 and 30 is non-convex overall, but convex with respect to W and H individually. For individual patterns, the objective function of equations 29 and 30 comprises a loss function that measures the approximation error of the factorization and a regularizer $\phi$ on the individual temporal patterns W and the individual activation codes H. $\lambda_1$ and $\lambda_2$ are weighting factors that influence the strength of the regularizer and trades-off the approximation error vs. the induced constraints. The problem uses an alternative optimization, such as block coordinate descent, where each factor is optimized in an alternate fashion. By setting $\phi_i$, to be $\|\cdot\|_2$ or $\|\cdot\|_1$, smoothness or sparsity can be enforced in trade-off with the approximation error of the factorization. Update rules for the doubly sparse convolutional decomposition model can be obtained by taking the gradient of L with respect to factors W and H diagonally rescaling the gradient with an appropriate learning rate $\eta$:

$$W = W - \eta_W \nabla_W L \tag{31}$$

$$H = H - \eta_H \nabla_H L \tag{32}$$

where $\eta_W$ and $\eta_H$ are learning rates that define the step size of the alternating gradient descent walk. For clarity, the non-convolutional forms of $$\frac{\partial L}{\partial W} \text{ and } \frac{\partial L}{\partial H}$$

are described first. The update rules for a static linear data model of eq (12) with the Frobenius loss can be derived, resulting in:

$$W := W \circ (XH^T) \bigg/ \left(WHH^T + \lambda_1 \frac{\partial \varphi_1(W)}{\partial w} + \varepsilon\right) \tag{33}$$

$$H := H \circ (W^T X) \bigg/ \left(W^T WH + \lambda_2 \frac{\partial \varphi_2(H)}{\partial h} + \varepsilon\right), \tag{34}$$

where a '∘' (the Hadamard or Shur product) and '/' are element-wise operators and $\epsilon$ is a small constant that is added to the denominator to prevent division by zero. The additional regularizers $\phi_1$ and $\phi_2$, require a scaling constraint on the factors W and H to prevent trivial solutions in the factorization. Normalization constraints on both factors can be enforced to balance the terms of the objective function. W uses unit norm bases, while H uses unit norm coefficients. The update rules for equations 26 and 27 are $$W^{KLD} := W \circ \frac{(X/WH)H^T}{1 \cdot H^T + \lambda_1 \frac{\partial \varphi_1(W)}{\partial w} + \varepsilon} \tag{35}$$

$$H^{KLD} := H \circ \frac{W^T(X/WH)}{1 \cdot W^T + \lambda_2 \frac{\partial \varphi_2(H)}{\partial h} + \varepsilon} \quad (36)$$

$$W^{ISD} := W \circ \frac{(X/(WH)^2)H^T}{\frac{1}{WH} \cdot H^T + \lambda_1 \frac{\partial \varphi_1(W)}{\partial w} + \varepsilon} \quad (37)$$

$$H^{KLD} := H \circ \frac{W^T(X/(WH)^2)}{W^T \frac{1}{WH} + \lambda_2 \frac{\partial \varphi_2(H)}{\partial h} + \varepsilon}. \quad (38)$$

These equations are particular instances of the general beta-divergence, where the generalized update equations take the form $$W^{BD} := W \circ \frac{(X \circ (WH)^{\beta-2})H^T}{(WH^{\beta-1}) \cdot H^T + \lambda_1 \frac{\partial \varphi_1(W)}{\partial w} + \varepsilon} \quad (39)$$

$$H^{BD} := H \circ \frac{W^T(X \circ (WH)^{\beta-2})}{W^T(WH)^{\beta-1} + \lambda_2 \frac{\partial \varphi_2(H)}{\partial h} + \varepsilon}. \quad (40)$$

The convolutional form of eqs 39 and 40 can be interpreted as finding T different factorizations $\{W\}_{t=1}^T$ and $\{H\}_{t=1}^T$. Here T denotes the size of the time window that is used to capture the dynamic structure of the spatial-temporal process $\xi$. The convolutional form of eqs 39 and 40 may be written in the form of a zero-one shift matrix.

Shifting matrices are zero-one matrices that have useful properties for the analysis of time series models. A shifting matrix S is a n×n matrix of the form $$S_1 \begin{bmatrix} 0 & & & 0 \\ 1 & \ddots & & \\ & \ddots & \ddots & \\ & 0 & \ddots & \ddots \\ & & & 1 & 0 \end{bmatrix} = \begin{bmatrix} 0 & 0 \\ I_{n-1} & 0 \end{bmatrix}, \quad (41)$$

where $S_1$ is the first associated shifting matrix out of n shifting matrices. $S_1$ has off-diagonal entries of value one and zero elsewhere. The pre- or post-multiplication of a matrix H with $S_1$ shifts the entries of H by one row or column respectively. The operator fills up the empty space that is created due to the shift with zero values. Shifting can be performed in a bi-directional manner. To right- and left-shift H by n shifts, one can use:

$$H_{n \to} = HS_n^T \quad (42)$$

$$H_{\leftarrow n} = HS_n. \quad (43)$$

Thus, in convolutional form, equations 39 and 40 can be written as:

$$W := W \circ \frac{\sum_{t=1}^T (B + WW^T A)H^T S_i^T}{\sum_{t=1}^T \left((A + WW^T B)H^T S_i^T + \lambda_1 \frac{\partial \varphi_1(W)}{\partial w} + \varepsilon\right)} \quad (44)$$

$$H := H \circ \frac{\sum_{t=1}^T W^T(X \circ (WHS_i)^{\beta-2})}{\sum_{t=1}^T \left(W^T(WHS_i)^{\beta-1} + \lambda_2 \frac{\partial \varphi_2(H)}{\partial h} + \varepsilon\right)} \quad (45)$$

$$A = (WHS_i^T)^{\beta-1} \quad (46)$$

$$B = X \circ (WHS_i^T)^{\beta-2} \quad (47)$$

where $WW^T$ results from the normalization constraint on $W_{normalized} = \|W\|_F$. The complete tensor W may be normalized by its $l_2$-norm, the Frobenius norm. The additional regularizers $\phi_1$ and $\phi_2$ require a scaling constraint on the factors W and H to prevent trivial solutions in the factorization. In general, normalization constraints on both factors can be enforced to balance the terms of the objective function. W needs to have unit norm bases. This normalization constraint is sufficient for the standard sparse coding framework, but insufficient for coping with the double sparsity problem. This factorization allows the learning of an efficient minimalistic representation of $\xi$ 302.

Whereas one could now use the latent factor model to perform group based analysis using a clustering scheme, the non-convex and non-unique objective of equations (29) and (30) impose problems regarding the reproducibility of the learned representation. In this regard, our goal is to learn the hidden group structure jointly given $\mathcal{G}_\xi$, or $\mathcal{P}_\xi$.

Figure 4:
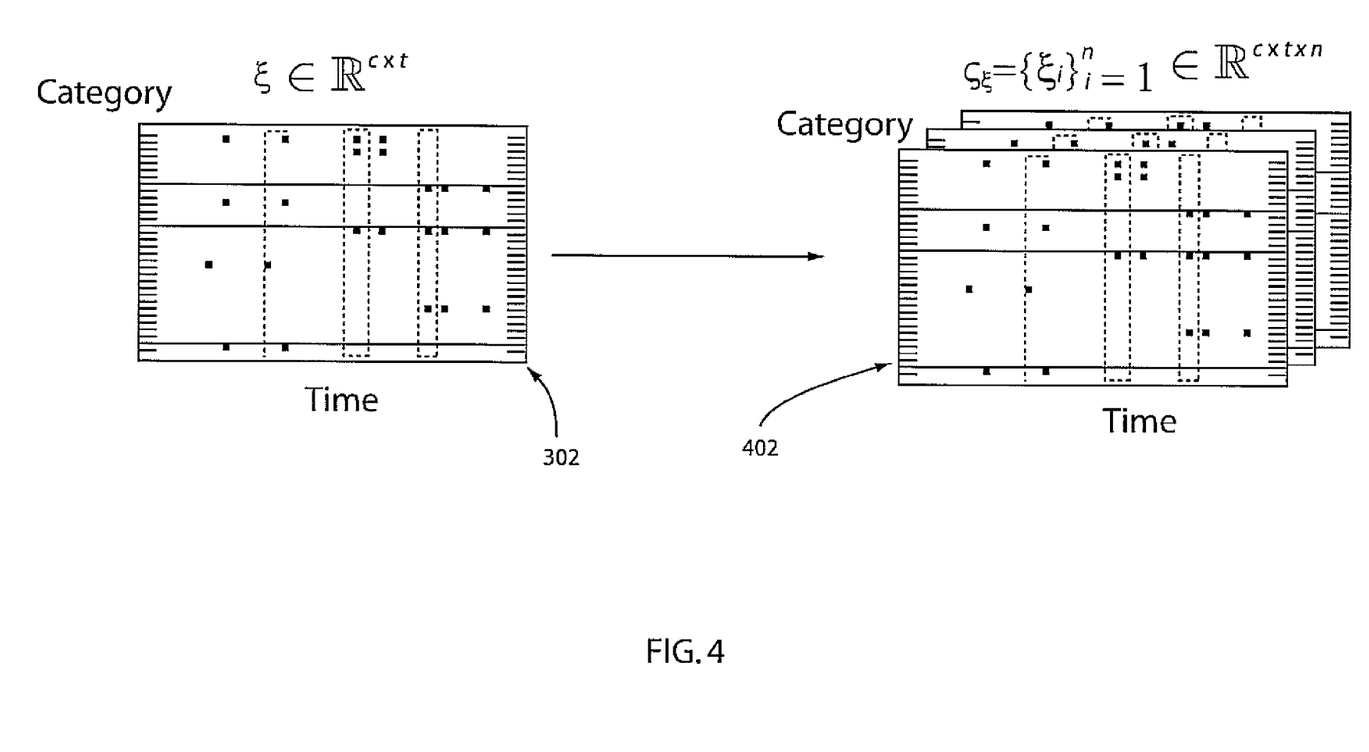
FIG. 4 is a diagram showing grouping multiple temporal event matrices into a tensor representation.

Multiple spatial-temporal point processes form a 3-way tensor where individual realizations of $\xi_i$ are stacked up on top of each other. To learn a group of multiple spatial point processes $\mathcal{G}_\xi = \{\xi_i\}_{i=1}^n \in R^{c \times t \times n}$, several different strategies may be employed. Referring now to FIG. 4, an illustration of $\mathcal{G}_\xi$ 402 is shown, collecting a plurality of samples numbered from 1 to n. In this way, multiple temporal event matrices can be represented as a single tensor.

A learning process for a group of STPPs may be of the form:

$$\min_{W \geq 0, H^{(n)} \geq 0} L(X^{(n)}, W, H^{(n)}) = \quad (48)$$

$$\sum_{i=1}^n \mathcal{D}_\beta(X^{(i)} | W * H^{(i)}) + \lambda_1 \varphi_1(W) + \lambda_2 \varphi_2(H^{(i)}). \quad (49)$$

where $X^{(n)} \in R^{c \times t \times n}$, $W \in R_+^{u \times v \times k}$, and $H^{(n)} \in_+^{k \times t \times n}$. In this setting, an efficient minimalistic group representation of $\mathcal{G}_\xi$ 402 arises that is able to account for variable length STPPs $\xi_i$. Using the multiple TEMRs 302 in $\mathcal{G}_\xi$ 402, the objective function of equations (48) and (49) use a W that includes population temporal patterns and an $H^{(i)}$ that includes population temporal codes. The update equations for learning W and $H^{(i)}$ are $$A^{(i)} = (WH^{(i)}S_t^T)^{\beta-1} \quad (50)$$

$$B^{(i)} = X^{(i)} \circ (WH^{(i)}S_t^T)^{\beta-2}, \quad (51)$$

with the partial derivative being $$\nabla_W J^- = \sum_{t=1}^{T} (B^{(i)} + WW^T A^{(i)}) H^{T(i)} S_i^T \quad (52)$$

$$\nabla_W J^- = \sum_{t=1}^{T} (A^{(i)} + WW^T B^{(i)}) H^{T(n)} S_i^T + \lambda_1 \frac{\partial \varphi_1(W)}{\partial w} \quad (53)$$

$$W = W \circ \frac{\nabla_W J^-}{\nabla_W J^+}. \quad (54)$$

For $H^{(i)}$:

$$\nabla_{H^{(i)}} J^- = \sum_{t=1}^{T} W^T \left( X^{(i)} \circ (WH^{(i)} S_i)^{(\beta-2)} \right) \quad (55)$$

$$\nabla_{H^{(i)}} J^+ = \sum_{t=1}^{T} W^T (WH^{(i)} S_i)^{(\beta-1)} + \lambda_2 \frac{\partial \varphi_2(H^{(i)})}{\partial h} \quad (56)$$

$$H^{(i)} = H^{(i)} \circ \frac{\nabla_{H^{(i)}} J^-}{\nabla_{H^{(i)}} J^+}. \quad (57)$$

Figure 5:
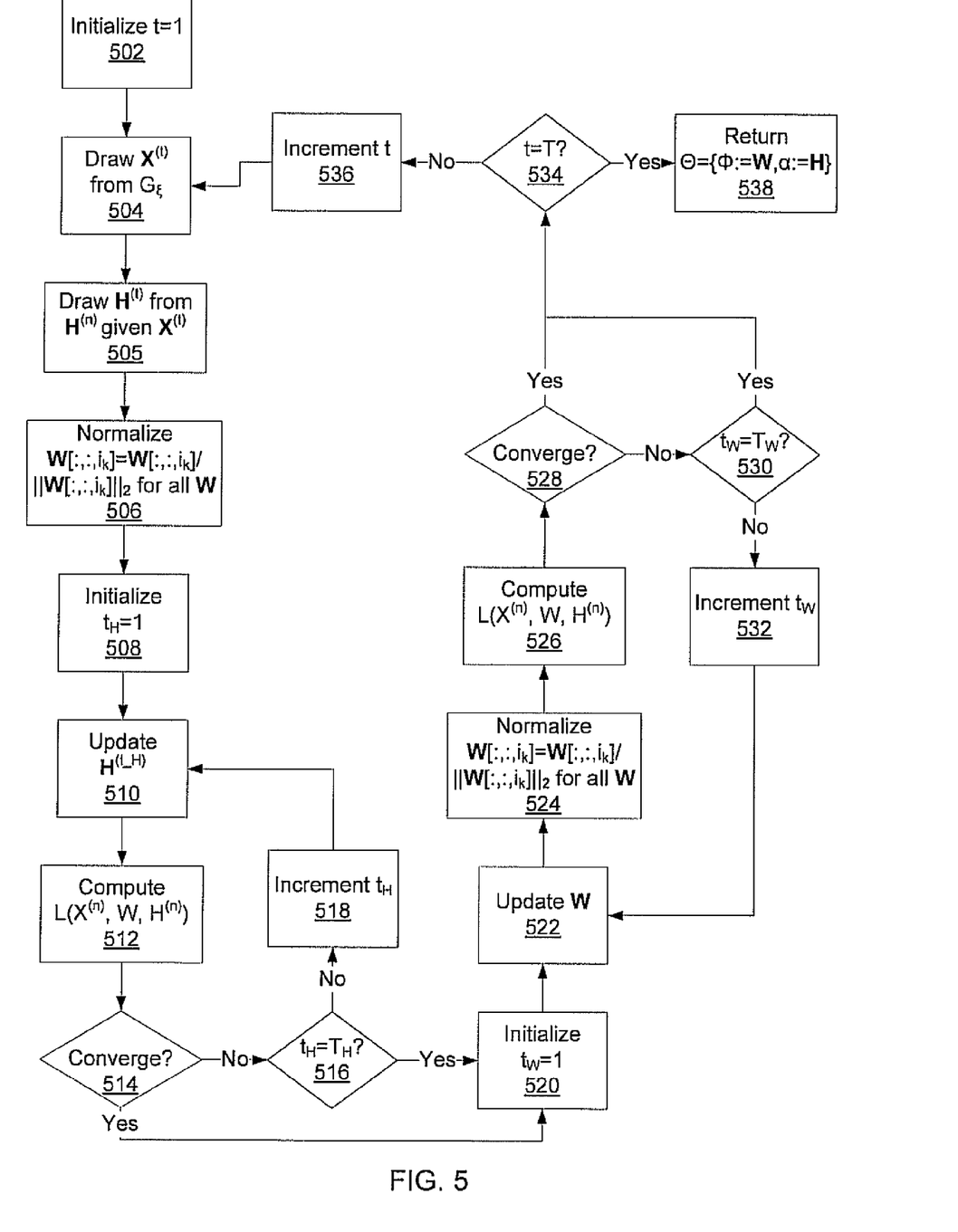
FIG. 5 is a block/flow diagram showing a method for online learning of a group structure.

A stochastic gradient descent scheme is used to learn the group structure of $\mathcal{G}_\xi$ 402 in an incremental fashion. Exemplary methods are shown herein, though it is contemplated that other learning schemes might be used. Referring now to FIG. 5, a first method for stochastic optimization of a group structure is shown. A loop starts at block 502, initializing the index t to one. Block 504 then draws a set of inputs $X^{(t)}$ from $\mathcal{G}_\xi$ 402. In this context, to "draw" a matrix can be understood as randomly selecting a single matrix 302 from the TEMR tensor representation, as $\mathcal{G}_\xi$ 402 is composed of multiple matrices. Block 505 then draws $H^{(i)}$ from $H^{(n)}$, as each $X^{(i)}$ has an associated $H^{(i)}$. The W matrix is normalized at each of its k elements by block 506. Block 508 begins a new loop across the H matrices, initializing an index $i_H$ to 1. Block 510 updates $H^{(t_n)}$ using equation (57). Block 512 then computes L($X^{(n)}$, W, $H^{(n)}$) according to equation 49. Block 514 then determines whether there is convergence. If there is convergence, the loop breaks and processing moves on to block 520. If not, the loop tests to see if $t_H$ has reached $T_H$. If so, the loop ends and processing moves on to block 520. If not, $t_H$ is incremented and processing returns to the block 510, where a new $H^{(t_n)}$ is selected.

Block 520 begins a new loop for the W matrices, initializing an index $t_W=1$. Block 522 updates W according to equation (54). Block 524 normalizes W again for all k elements. Block 526 again computes L($X_{(n)}$, W, $H^{(n)}$). Block 528 checks for convergence. If convergence is found, the loop breaks and processing moves on to block 534. If not, the loop checks whether $t_W$ has reached $T_W$. If so, the loop ends and processing moves to block 534. If not, block 532 increments $t_W$ and returns processing to block 522. Block 534 determines whether the overall index t has reached T. If not, block 536 increments t and processing returns to block 504. If so, block 538 returns the group structure $\Theta$ is returned.

Figure 6:
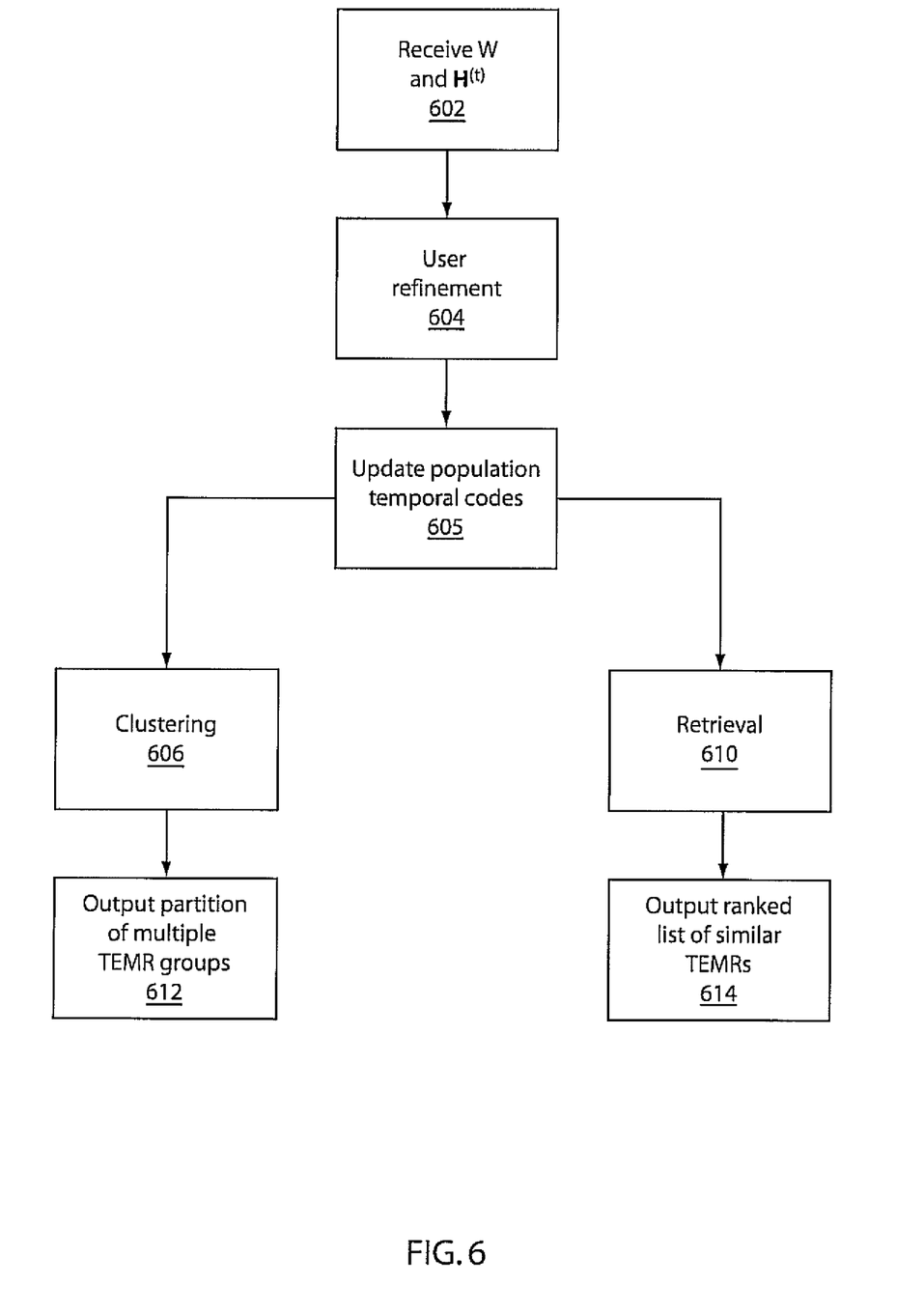
FIG. 6 is a block/flow diagram showing a method/system for temporal event mining.

Referring now to FIG. 6, a method used by temporal event mining component 110 is shown. The temporal event mining component 110 takes as input in block 602 a set of population temporal patterns W and a set of population temporal codes $H^{(t)}$. A user may customize how population temporal patterns are handled via user-dependent selection and refinement criteria at block 604. Block 605 uses user-refined population temporal patterns to estimate updated population temporal codes. Block 606 performs clustering and block 610 performs retrieval using a learning algorithm such as that shown in FIG. 5 above. Block 606 produces an output 612 of a partition of multiple TEMR groups, where each group includes similar TEMR instances governed by pre-defined or learned distance metrics. Retrieval block 610 outputs 614 a ranked list of similar TEMRs based on a given query TEMR. Clustering and ranking are shown for the sake of illustration. Other learning paradigms may be used instead or in addition.

Figure 7:
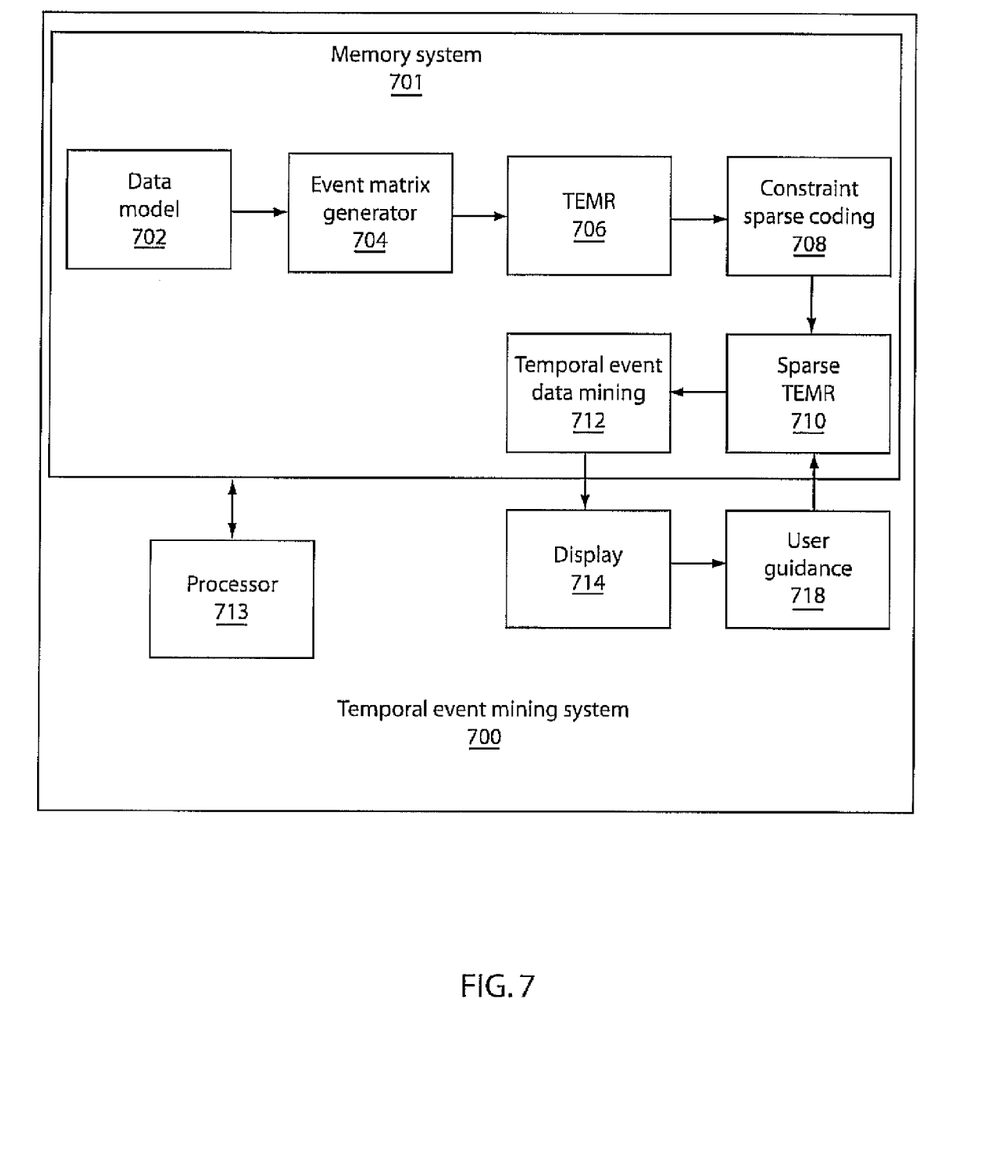
FIG. 7 is a block/flow diagram showing an interactive system for temporal event mining.

Referring now to FIG. 7, an open-ended temporal event mining system 700 is shown. The temporal event mining system 700 comprises a memory system 701 and a processor 713 in communication. A data model 702 stores unstructured, heterogeneous event data of any generic population entity, such as people, patients, locations, etc. The data model may be stored in any sort of physical storage device and may receive its event data from any input, including automated sensors and manual entry. An event matrix generator 704 converts a population entity within the data model to multiple TEMRs 706. A constraint sparse coding component 708 learns a sparse representation 710 of TEMRs 706 according to the principles described above. A temporal event data mining component 712 performs analytics on the sparse representation 710 for knowledge discovery and is connected to a visualization display 714. Temporal event data mining component 712 uses processor 713 to perform data mining. The display 714 allows a user 716 to perform interactive refinement on the learned sparse TEMR model 710. In this manner, the user can guide the event mining system and rapidly acquire relevant information.

Having described preferred embodiments of a system and method for mining temporal patterns in longitudinal event data using discrete event matrices and sparse coding (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for event pattern mining comprising:
   representing longitudinal event data in a measurable geometric space as a temporal event matrix representation (TEMR) using spatial temporal shapes, wherein event data is organized into hierarchical categories of event type; and
   performing temporal event pattern mining with a processor by locating visual event patterns among the spatial temporal shapes of said TEMR using a constraint sparse coding framework.

2. The method of claim 1, wherein said representing further comprises mapping event information from a probabilistic event space to said measurable geometric space.

3. The method of claim 1 wherein said performing temporal event pattern mining further comprises online non-negative matrix factorization.

4. The method of claim 1, further comprising refining event patterns using user feedback.

5. The method of claim 1, wherein performing temporal event pattern mining further comprises extracting individual latent temporal patterns in the form of feature images and activation codes from data for an entity.

6. The method of claim 1, wherein sparsity is enforced in the geometric representation using one or more regularizers.

7. The method of claim 1, wherein the TEMR is constrained to prevent trivial solutions.

8. The method of claim 1, wherein performing temporal event pattern mining further comprises clustering multiple entities into pattern groups using exploratory analytic learning.

9. The method of claim 1, wherein performing temporal event pattern mining further comprises ranking entities by similarity to a test pattern.

10. The method of claim 1, wherein event information is mapped to a spatial-temporal shape process in the form of a discrete event matrix.

11. The method of claim 1, wherein the spatial temporal shapes include at least one of single events, event intervals, and high-order event structures.

12. A non-transitory computer readable storage medium comprising a computer readable program, wherein the computer readable program when executed on a computer causes the computer to perform the method of claim 1.

13. A method for event pattern mining comprising:
mapping longitudinal event data from a probabilistic event space to a temporal event matrix representation (TEMR) in a measurable geometric space, wherein event data is organized into hierarchical categories of event type;
performing temporal event pattern mining with a processor by locating visual event patterns among spatial temporal shapes of said TEMR using a processor to perform online non-negative matrix factorization by clustering and ranking multiple entities into pattern groups; and
refining the learned patterns using user feedback.

14. A system for event pattern mining comprising:
an event matrix generator configured to represent longitudinal event data in a measurable geometric space as a temporal event matrix representation (TEMR) using spatial temporal shapes, wherein event data is organized into hierarchical categories of event type; and
a temporal event data mining component configured to perform temporal event pattern mining with a processor by locating visual event patterns among the spatial temporal shapes of said TEMR using a constraint sparse coding framework.

15. The system of claim 14, wherein the event matrix generator is configured to map event information from a probabilistic event space to said measurable geometric space.

16. The system of claim 14, wherein the temporal event data mining component is further configured to perform online non-negative matrix factorization.

17. The system of claim 14, further comprising a constraint sparse coding component configured to enforce sparsity in the representation using a regularizer.

18. The system of claim 17, wherein the constraint sparse coding component uses user feedback to refine the sparse representation.

19. The system of claim 17, wherein the TEMR is constrained to prevent trivial solutions.

20. The system of claim 14, wherein the temporal event data mining component is further configured to extract individual latent temporal patterns in the form of feature images and activation codes from data for an entity.

21. The system of claim 14, wherein the temporal event data mining component is further configured to cluster multiple entities into pattern groups using exploratory analytic learning.

22. The system of claim 14, wherein the temporal event data mining component is further configured to rank entities by similarity to a test pattern.

23. The system of claim 14, wherein event information is mapped to a spatial-temporal shape process in the form of a discrete event matrix.

24. The system of claim 14, wherein the spatial temporal shapes include at least one of single events, event intervals, and high-order event structures.

* * * * *